United States Patent [19]

Ishida et al.

[11] Patent Number: 4,674,283
[45] Date of Patent: Jun. 23, 1987

[54] TURBOCHARGING SYSTEM FOR AN INTERNAL COMBUSTION ENGINE

[75] Inventors: Noboru Ishida; Mitsuyoshi Kawamura; Toshiyuki Ishihara, all of Aichi, Japan

[73] Assignee: NGK Spark Plug Co., Ltd., Aichi, Japan

[21] Appl. No.: 788,046

[22] Filed: Oct. 16, 1985

[30] Foreign Application Priority Data

Oct. 16, 1984 [JP] Japan ................. 59-217079

[51] Int. Cl.⁴ ............................................. F02B 33/44
[52] U.S. Cl. ........................................ 60/606; 60/276
[58] Field of Search ............... 60/606, 276, 304, 305, 60/306

[56] References Cited

U.S. PATENT DOCUMENTS 3,380,245 4/1968 Mick ..................................... 60/606
3,442,077 5/1969 Youhouse ............................. 60/606
4,091,620 5/1978 Dorsch ................................. 60/606

FOREIGN PATENT DOCUMENTS 1012365 7/1952 France ................................. 60/606
421110 12/1934 United Kingdom ................. 60/606

Primary Examiner—Stephen F. Husar
Attorney, Agent, or Firm—Finnegan, Henderson, Farabow, Garrett and Dunner

[57] ABSTRACT

A turbocharging system for an internal combustion engine improves performance and efficiency under low-speed, high-load operating conditions by adding secondary air to the exhaust gas upstream of the turbocharger. The secondary air combusts with unburned fuel contained in the exhaust gas to increase the temperature and pressure of the exhaust gas driving the turbocharger. Secondary air is added only when the exhaust gas temperature is above a prescribed temperature and the air-fuel ratio of the exhaust gas is below a prescribed ratio.

19 Claims, 3 Drawing Figures

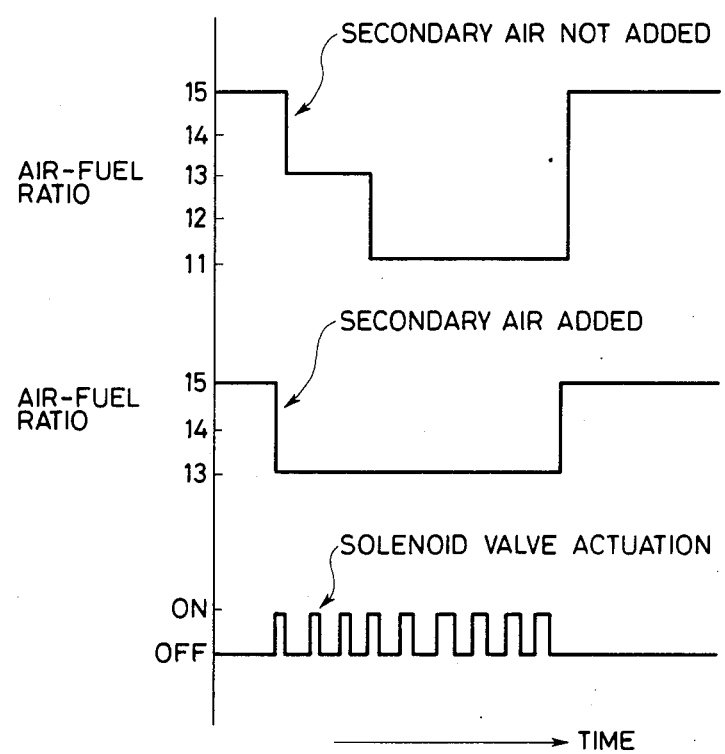

TURBOCHARGING SYSTEM FOR AN INTERNAL COMBUSTION ENGINE

BACKGROUND OF THE INVENTION

1. Field of the Invention

The present invention relates to a forced-induction system for an internal combustion engine. More particularly, the present invention relates to a turbocharger system for increasing the power and efficiency of an internal combustion engine run at low speed and heavy load.

2. Description of the Related Art

A turbocharger used as means for providing forced induction to increase power and improve fuel efficiency of an internal combustion engine, particularly an automobile engine, employs exhaust energy to rotate an exhaust turbine connected by a shaft to an intake compressor. The compressor compresses the air-fuel mixture or intake air that is subsequently mixed with fuel to increase the energy obtained from the ignition of the air-fuel mixture in the cylinders.

The improvements achievable by turbocharging an internal combustion engine, however, are influenced by the running conditions of the vehicle. In general, satisfactory forced induction from a turbocharger can be expected if the pressure and temperature of the exhaust gas driving the turbine are above certain levels. Exhaust gas temperature is a particularly important factor in achieving high-speed rotation of the turbine when the vehicle is run at a moderate or high speed and under a heavy load. In contrast, a turbocharger often makes no specific contribution to improvement of the output of the engine when the engine is run at a low speed and under a heavy load. Low-speed, high-load conditions in a turbocharged engine produce a decrease in both the pressure of exhaust gas generated and in the exhaust gas temperature when compared to moderate or high speed conditions. It is generally believed that the higher the exhaust gas temperature, the better the turbine efficiency.

Although attempts have been made to increase exhaust gas temperature by providing an ignition time lag or by increasing intake air temperature, such methods have inherent disadvantages. The former involves a trade off in fuel combustion efficiency and stability, and the latter produces a reduction in the volume of oxygen inducted into the cylinders or in the durability of the engine because of the resulting temperature and pressure increase in the cylinders.

It is an object of the present invention to provide an improved internal combustion engine with a turbocharger that is capable of performing a forced induction function satisfactorily at low engine speed and high load without lowering fuel combustion efficiency or durability of the engine.

Additional objects and advantages of the present invention will be set forth in part in the description that follows and in part will be obvious from that description or can be learned by practice of the invention. The objects and advantages of the invention can be realized and obtained by the system particularly pointed out in the appended claims.

SUMMARY OF THE INVENTION

The present invention overcomes the problems of prior art turbocharging systems and achieves the objects listed above by providing a system that adds secondary air to the exhaust gas upstream of the turbocharger turbine when the exhaust gas temperature is above a prescribed temperature and the air-fuel ratio of the exhaust gas is richer than a desired level. The secondary air added to the rich exhaust gas mixture combusts with unburned fuel in the exhaust gas, thereby increasing the pressure and temperature of the exhaust gas driving the turbocharger.

To achieve the objects and in accordance with the purpose of the invention, as embodied and broadly described herein, the turbocharging system of this invention for an internal combustion engine having an exhaust system including an exhaust manifold for removing exhaust gas from the engine comprises a turbocharger including a turbine portion and a compressor portion connected together by shaft means, the turbine portion being in flow communication with the exhaust system and being rotatably driven by the exhaust gas, and secondary air supply means for adding secondary air to the exhaust gas upstream of the turbine portion with respect to the direction of flow of the exhaust gas, the secondary air combusting with unburned fuel remaining in the exhaust gas to increase the temperature and pressure of the exhaust gas driving the turbine portion. Broadly, the turbocharging system of the invention also includes means for detecting and producing signals communicating the air-fuel ratio of the exhaust gas in the exhaust system, means for detecting and producing signals communicating the temperature of the exhaust gas in the exhaust system upstream of the turbine portion, and control means communicating with the air-fuel ratio detecting means and the exhaust temperature detecting means for controlling the amount of secondary air added to the exhaust gas by the secondary air supply means in response to the signals produced by the air-fuel ratio detecting means and the exhaust temperature detecting means. The control means actuates the secondary air supply means when the air-fuel ratio detecting means detects an exhaust gas air-fuel ratio below a prescribed ratio and the exhaust temperature detecting means detect an exhaust gas temperature above a prescribed temperature.

Preferably, the control means actuates the secondary air supply means when the temperature of the exhaust gas exceeds approximately 600° C. and the air-fuel ratio of the exhaust gas is below about 13.8:1, the secondary air is added through a secondary air induction port positioned upstream from the turbine portion by at least about 50 mm, and the secondary air supply means includes means for regulating the pressure of the secondary air at a level about 3 kg/cm$^2$ above the pressure of the exhaust gas in the exhaust manifold.

The accompanying drawings, which are incorporated in and which constitute a part of this specification, illustrate at least one embodiment of the invention and, together with the description, explain the principles of the invention.

BRIEF DESCRIPTION OF THE DRAWINGS

FIG. 3 is a time chart comparing the exhaust gas air-fuel ratio of the internal combustion engine shown in FIG. 1 with that of a turbocharged internal combustion engine lacking secondary air supply means.

DESCRIPTION OF THE PREFERRED EMBODIMENT

Reference now will be made in detail to the presently preferred embodiments of the invention, examples of which are illustrated in the accompanying drawings.

Figure 1:
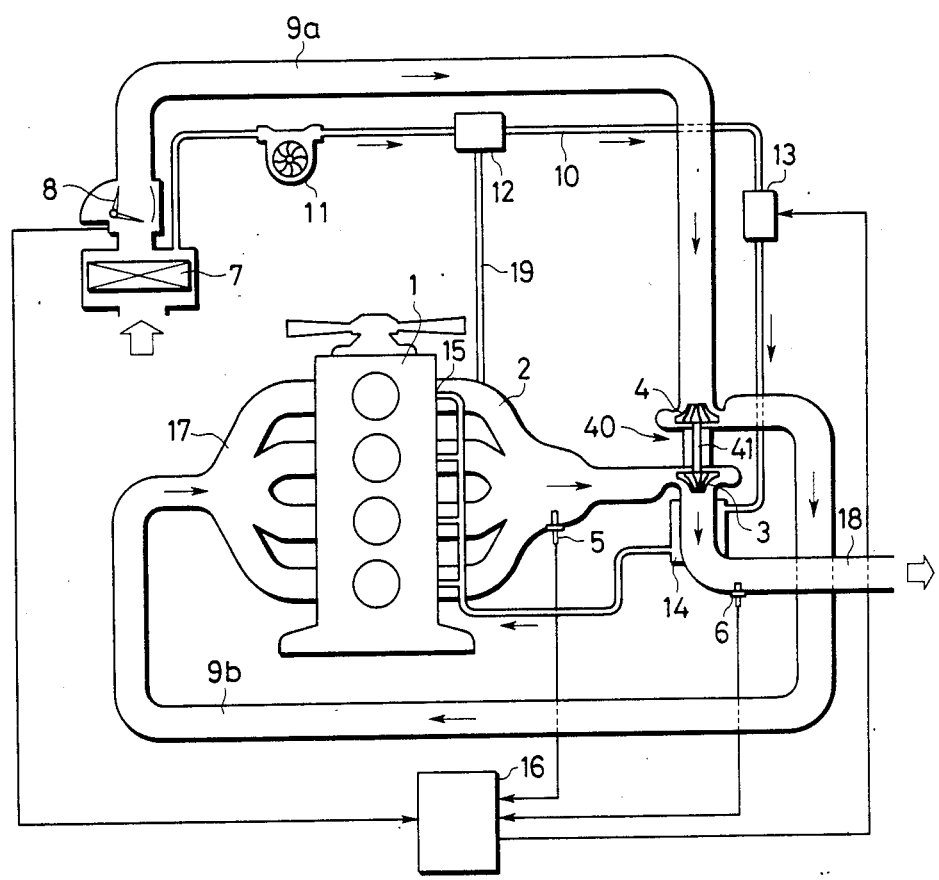
FIG. 1 is a schematic view of an internal combustion engine equipped with one embodiment of the turbocharging system according to this invention.

FIG. 1 is a schematic view of a four-cylinder internal combustion engine, including engine block 1 and exhaust manifold 2, equipped with a turbocharging system according to this invention. The turbocharging system includes turbocharger 40, which comprises turbine 3 and compressor 4 connected by shaft 41. Turbine 3 is provided downstream of exhaust manifold 2. The configuration of the turbine is not known to be critical to the invention. As embodied herein, turbine 3 is a radial-inflow turbine, the exhaust gas entering the turbine housing at the periphery of the turbine and exiting at the center. After passing through the turbine housing and driving the turbine, which in turn drives compressor 4, the exhaust gas exits the turbine housing through exhaust pipe 18. The arrows within exhaust mainfold 2 and exhaust pipe 18 indicate the direction of exhaust gas flow.

Intake air cleaner 7 and intake air control valve 8 are connected to compressor 4 of turbocharger 40 by intake pipe 9a. Intake pipe 9b, in turn, connects compressor 4 to intake manifold 17. The arrows within intake pipes 9a, 9b and intake manifold 17 indicate the direction of intake air flow.

The turbocharging system includes means for detecting and producing signals communicating the temperature of the exhaust gas. As embodied herein, the exhaust temperature detecting means comprises exhaust temperature sensor 5, which is mounted on a portion of the exhaust system upstream of turbine 3, preferably, on the exterior of exhaust manifold 2. The turbocharging system also includes means for detecting and producing signals communicating the air-fuel ratio of the exhaust gas. As embodied herein, the air-fuel ratio detecting means includes air-fuel ratio sensor 6, which is disposed in exhaust pipe 18 downstream of turbine 3.

Furthermore, the turbocharging system includes means for adding secondary air to the exhaust gas upstream of the turbine. As embodied in FIG. 1, secondary air supply means includes air pump 11, regulator 12 for governing secondary air pressure, solenoid valve 13 for controlling secondary air supply, secondary air preheater 14, and secondary air induction ports 15 provided in the cylinder head portion of engine block 1. Air pump 11, regulator 12, solenoid valve 13, preheater 14, and induction ports 15 are connected in series between air cleaner 7 and engine block 1 via secondary air supply pipe 10. The arrows alongside secondary air supply pipe 10 indicate the direction of secondary air flow. Vent pipe 19 connects regulator 12 to exhaust manifold 2 and enables regulator 12 to detect the exhaust gas pressure within exhaust manifold 2. Means for controlling the amount of secondary air added to the exhaust gas includes secondary air supply control unit 16, which monitors sensors 5, 6 and intake air control valve 8 and actuates solenoid valve 13.

Figure 2:
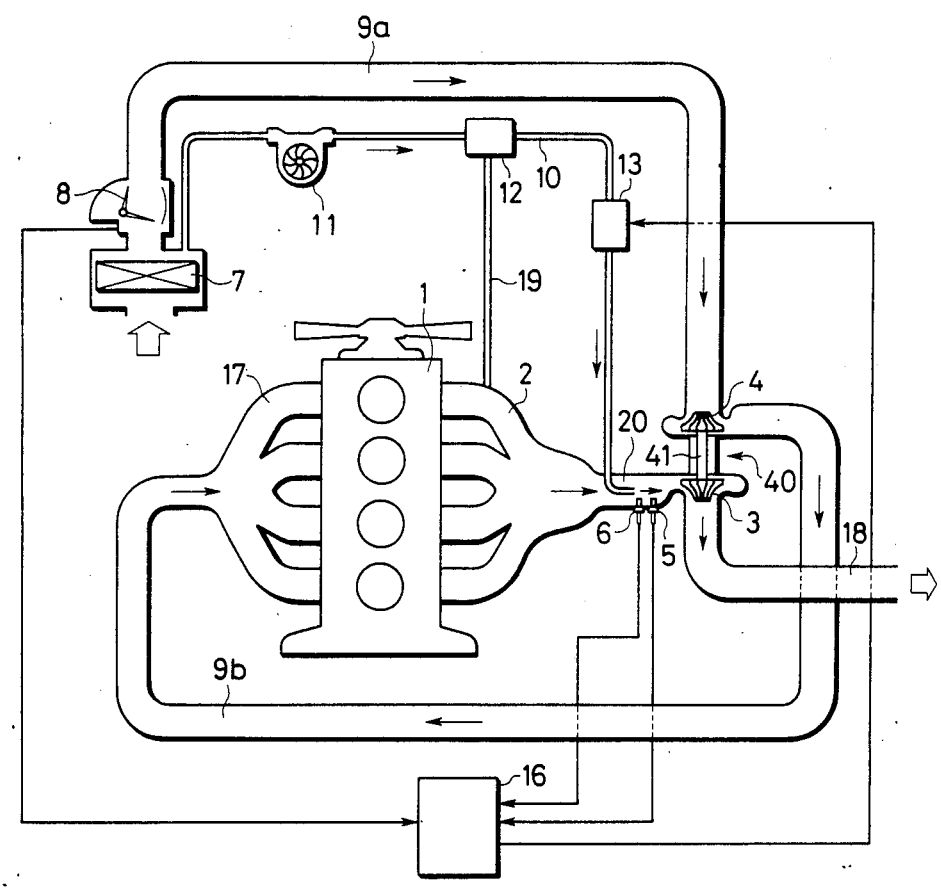
FIG. 2 is a schematic view of an internal combustion engine equipped with a second embodiment of the turbocharging system according to this invention.

FIG. 2 is a schematic view of a second embodiment of the turbocharging system of this invention. Like reference numerals are used to designate the same or similar parts shown in FIG. 1. In the embodiment shown in FIG. 2, solenoid valve 13 is connected directly to the downstream end of exhaust manifold 2 via secondary air supply pipe 10 and a single secondary air induction port 20. Thus, secondary air is added to the exhaust gas through a single induction port adjacent and upstream of turbine 3. Both exhaust temperature sensor 5 and air-fuel ratio sensor 6 are mounted to exhaust manifold 2 adjacent induction port 20 and upstream of turbine 3.

FIG. 3 is a time chart on which are plotted the changes in air-fuel ratio of a turbocharged engine with and without the introduction of secondary air into the exhaust system. FIG. 3 also shows the actuation and deactivation of solenoid valve 13 for controlling the addition of secondary air.

The operation of the turbocharging system shown in FIG. 1 now will be explained.

When the exhaust temperature is below a prescribed temperature, for example, about 600° C., or the air-fuel ratio of the exhaust gas is above a prescribed ratio, indicating that the exhaust gas is not overly rich (i.e., it does not contain an excessive amount of unburned fuel), turbine 3 of turbocharger 40 is driven by only the combustion exhaust gas discharged from exhaust manifold 2. As the engine warms up, the exhaust temperature gradually increases. Exhaust temperature sensor 5, mounted on exhaust manifold 2 upstream of turbine 3, communicates a signal to secondary air supply control unit 16 when it detects a temperature greater than the prescribed temperature. Air-fuel ratio sensor 6, located in exhaust pipe 18 downstream of turbine 3, communicates a signal to control unit 16 when it detects an air-fuel ratio lower than the prescribed air-fuel ratio. Sensors 5, 6 can be of the type that regularly measures the temperature or air-fuel ratio and communicates the measurement to control unit 16 or of the type that communicates with control unit 16 only when the prescribed threshold exhaust gas temperature or richness is surpassed. When secondary air supply control unit 16 receives signals from sensors 5 and 6 indicating that the exhaust gas has achieved prescribed levels of temperature and richness, control unit 16 sends a signal causing solenoid valve 13 to open and supply secondary air to the exhaust gas through induction ports 15.

The secondary air is sucked through air cleaner 7 into secondary air supply pipe 10 by air pump 11. Air cleaner 7 is positioned in a fresh-air section of engine intake pipe 9a. The pressure of the secondary air is regulated by secondary air governing regulator 12, which is located upstream of solenoid valve 13 and preferably maintains the secondary air pressure at about 3 kg/cm$^2$ greater than the internal pressure in exhaust manifold 2. Regulator 12 detects the internal pressure of exhaust manifold 2 through exhaust gas vent pipe 19. After the secondary air passes through opened solenoid valve 13, it enters preheater 14, which preferably is configured to surround exhaust pipe 18. Heat is transferred from exhaust pipe 18 to the secondary air in preheater 14, thus increasing the temperature of the secondary air. The heated secondary air then emerges from secondary air induction ports 15, preferably in synchronization with the exhaust stroke of each piston, and is mixed with the combustion exhaust gas exiting the cylinder. Preferably, solenoid valve 13 is controlled by control unit 16 to open and close in synchronization with the exhaust strokes of the pistons. Alternatively, each cylinder can be provided with an individual solenoid valve that is synchronized with the exhaust stroke of that cylinder.

Particularly during low-speed, high-load operation, an unburned air-fuel mixture having a low (i.e., rich) air-fuel ratio remains in the exhaust gas supplied to turbine 3. Secondary air is added to this rich exhaust gas mixture to combust the residual fuel and thereby raise the temperature of the exhaust gas driving the turbine. Combustion of the residual fuel by the addition of secondary air also increases the displacement and pressure of the exhaust gas upstream of turbine 3. The resulting exhaust gas energy is sufficient to rotate turbine 3 at a high speed even when the engine is run at low speed and under heavy load.

Secondary air is not added until the exhaust gas reaches a prescribed temperature of, for example, about 600° C. because, if the exhaust gas is below the prescribed temperature, the residual fuel will not combust with the added secondary air. At temperatures below the prescribed threshold the addition of secondary air will decrease the temperature of the exhaust gas and lower the operating efficiency of the turbocharger. The minimum exhaust gas temperature that will combust with secondary air is, of course, influenced by the configuration of the engine and exhaust system. In general, the exhaust gas must be at a temperature of about 600° C. or more to combust with preheated secondary air. If the secondary air is not preheated, it is preferable to add secondary air only after the exhaust gas temperature exceeds about 700° C.

In the embodiment shown in FIG. 1, secondary air induction ports 15 introduce the secondary air at the cylinder head portion of the engine. This is a preferred location because it is the hottest portion of the exhaust system and, therefore, provides high temperature exhaust gas for combustion with the secondary air. Introducing secondary air at the cylinder head portion of engine block 1 also enables the combustion of residual fuel in the exhaust gas to begin at a location removed from turbine 3, thus permitting more complete combustion of the residual fuel before the exhaust gas/secondary air mixture reaches the turbine.

A secondary air pressure of about 1.5 kg/cm² or more normally is sufficient for forcing the secondary air into the exhaust system, because the internal pressure in the exhaust manifold of an automobile engine normally does not exceed 1.4 kg/cm². Preferably, the prescribed temperature is set higher than the aforementioned temperatures (600° C. with preheating, 700° C. without preheating) to ensure greater pressure forcing.

Modifications of the embodiment shown in FIG. 1 can be made without departing from the invention. For example, turbine 3 and compressor 4 can be supported by air bearings that receive air pressure from an air compressor also serving as secondary air pump 11. Heat resistant ceramics such as $Si_3N_4$ and SiC can be used as the material for turbine 3 to prolong the service life of the turbine in its high-temperature environment. Also, the air-fuel ratio detecting means can comprise a fuel control unit that is actuated according to data received from an airflow meter in a mixture supply system and a fuel injector, instead of air-fuel ratio sensor 6. Alternatively, the amount of secondary air added may be feedback controlled to maintain a constant air-fuel ratio of, for example, 13.8:1 in response to the signal from air-fuel ratio sensor 6.

Table 1 is a comparison table showing the effect of introducing secondary air into a turbocharged four-cylinder engine having a displacement of 1800 cc. Table I sets forth various performance characteristics of the engine equipped with the turbocharging system shown in FIG. 1 and operated at 4000 rpm both with and without the introduction of secondary air into induction ports 15. The secondary air supply system was feedback controlled to maintain the air-fuel ratio at approximately 13.8:1.

TABLE 1

| Performance Characteristic | Secondary Air Not Added | Secondary Air Added |
|---|---|---|
| Engine Speed (rpm) | 4000 | 4000 |
| Load (%) | 100 | 100 |
| Exhaust Temperature (°C.) | 780 | 950 |
| Boost Pressure (mm Hg) | 500 | 600 |
| Exhaust Manifold Pressure (kg/cm²) | 1.2 | 1.3 |
| Turbocharger Speed (rpm) | 120,000 | 146,000 |
| Air-Fuel Ratio (%) | 11.0 | 13.8 |

Adding secondary air to the exhaust gas when the engine was operated at 4000 rpm under full load produced combustion of the unburned, residual fuel contained in the exhaust gas and provided a boost pressure 20% greater than the boost pressure provided by compressor 4 when secondary air was not added. The turbocharger rotated about 22% faster when secondary air was added. Moreover, exhaust manifold pressure increased by less than 10%, so that pumping losses and other drawbacks of increased exhaust back pressure were minimal when viewed in light of the increased boost pressure and turbocharger speed.

FIG. 3 is a time chart showing characteristic air-fuel ratio waveforms for the tested engine with and without the addition of secondary air. The tests were carried out in a condition under which the air-fuel ratio was set at 13.8:1 with due consideration for engine output, exhaust purification, and fuel economy.

The second embodiment of the turbocharger system of this invention, shown in FIG. 2, is similar to the first embodiment except that secondary air is mixed with the exhaust gas through secondary air induction port 20, which is located upstream of the jet nozzle of turbine 3 (instead of at the cylinder head portion) by a distance of about 100 mm. To achieve adequate combustion of the residual fuel in the exhaust gas by the addition of secondary air into the exhaust system and to maximize the increase in temperature and pressure of the exhaust gas driving turbine 3, secondary induction port 20 should be separated from the inlet of turbine 3 by a distance that will provide sufficient time for combustion of the exhaust gas/secondary air mixture before it reaches turbine 3. We have found that the distance should be at least about 50 mm.

Table II is a table comparing the effect of adding secondary air to a turbocharged four-cylinder engine by using the system shown in FIG. 2. The engine is the same as that used in the test summarized in Table I, but measurements were taken at an operating speed of 2000 rpm. In the case where secondary air was added, the secondary air was pressurized by air pump 11 and regulated by regulator 12 to be 3 kg/cm² greater than the exhaust gas pressure in exhaust manifold 2. The capacity of the secondary air supply system was 2 m³/min. For the tests summarized in Table II, secondary air was introduced when the exhaust temperature exceeded 650° C. and the air-fuel ratio fell below 14:1. If the air-fuel ratio dipped below 12:1, secondary air was added in an amount equal to about twice the mass of the fuel being supplied. Above a ratio of 12:1, the supply rate of a secondary air was approximately equal to the fuel supply rate, by mass. The secondary air pressure was not maintained at a constant level by a feedback system.

TABLE II

| Performance Characteristics | Secondary Air Not Added | Secondary Air Added |
|---|---|---|
| Engine Speed (rpm) | 2000 | 2000 |
| Load (%) | 100 | 100 |
| Exhaust Temperature (°C.) | 670 | 790 |
| Boost Pressure (mm Hg) | 197 | 350 |
| Exhaust Manifold Pressure (kg/cm$^2$) | 0.32 | 0.72 |
| Turbocharger Speed (rpm) | 62,000 | 85,000 |
| Air-Fuel Ratio (%) | 11 | 13 |
| Engine Output (bhp JIS) | 43 | 60 |

It is apparent from the test results of Table II that the introduction of secondary air provides a remarkable improvement in engine performance at low engine speed. On a percentage basis, the improvement at 2000 rpm is better than that at 4000 rpm. Turbocharger speed increased by about 37% with the addition of secondary air and provided an increase in boost pressure of about 78%.

It will be apparent to those skilled in the art that modifications and variations can be made to the turbocharging system of this invention without departing from the scope of the invention. For example, although the invention has been described with reference to a four-cylinder engine, it can be applied to engines having any number of cylinders. It can be applied to both spark-ignited engines and diesel engines. Also, when used with V-block internal combustion engines, either a single or double turbocharger system can be used. The invention in its broader aspects is, therefore, not limited to the specific details and illustrated examples shown and described. Accordingly, it is intended that the present invention cover such modifications and variations, provided that they fall within the scope of the appended claims and their equivalents.

What is claimed is:

1. A turbocharging system for an internal combustion engine having an exhaust system including an exhaust manifold for removing exhaust gas from said engine, said turbocharging system comprising:
   a. a turbocharger including a turbine portion and a compressor portion connected together by shaft means, said turbine portion being in flow communication with said exhaust system and being rotatably driven by said exhaust gas; and
   b. secondary air supply means for adding secondary air to said exhaust gas upstream of said turbine portion with respect to the direction of flow of said exhaust gas when the air-fuel ratio of said exhaust gas is below a prescribed ratio, said secondary air combusting with unburned fuel remaining in said exhaust gas to increase the temperature and pressure of said exhaust gas driving said turbine portion.

2. A turbocharging system for an internal combustion engine having an exhaust system including an exhaust manifold for removing exhaust gas from said engine, said turbocharging system comprising:
   a. a turbocharger including a turbine portion and a compressor portion connected together by shaft means, said turbine portion being in flow communication with said exhaust system and being rotatably driven by said exhaust gas;
   b. secondary air supply means for adding secondary air to said exhaust gas through a secondary air induction port located upstream of said turbine portion with respect to the direction of flow of said exhaust gas, said secondary air combusting with unburned fuel remaining in said exhaust gas to increase the temperature and pressure of said exhaust gas driving said turbine portion;
   c. means for detecting and producing signals communicating the air-fuel ratio of said exhaust gas in said exhaust system;
   d. means for detecting and producing signals communicating the temperature of said exhaust gas in said exhaust system upstream of said turbine portion; and
   e. control means communicating with said air-fuel ratio detection means and said exhaust temperature detection means for controlling the amount of secondary air added to said exhaust gas by said secondary air supply means in response to said signals produced by said air-fuel ratio detecting means and said exhaust temperature detecting means, said control means actuating said secondary air supply means when said air-fuel ratio detecting means detects an exhaust gas air-fuel ratio below a prescribed ratio and said exhaust temperature detecting means detects an exhaust gas temperature above a prescribed temperature.

3. The turbocharging system of claim 2, wherein said prescribed temperature is approximately 600° C.

4. The turbocharging system of claim 2, wherein said prescribed ratio is about 13.8:1.

5. The turbocharging system of claim 2, wherein said air-fuel ratio detecting means includes an air-fuel ratio sensor mounted to said exhaust system downstream of said turbine portion.

6. The turbocharging system of claim 2, wherein said air-fuel ratio detecting means includes an air-fuel ratio sensor mounted to said exhaust system upstream of said turbine portion.

7. The turbocharging system of claim 2, wherein said exhaust temperature detecting means includes a temperature sensor mounted to said exhaust system adjacent said induction port.

8. The turbocharging system of claim 2, wherein said engine includes a head portion and said secondary air induction port is located in said head portion.

9. The turbocharging system of claim 2, wherein said secondary air induction port is positioned upstream from said turbine portion by at least about 50 mm.

10. The turbocharging system of claim 2, wherein the pressure of said secondary air is more than about 1.5 kg/cm$^2$.

11. The turbocharging system of claim 2, wherein said secondary air supply means includes means for preheating said secondary air prior to adding said secondary air to said exhaust gas.

12. The turbocharging system of claim 11, wherein said preheating means uses the heat of said exhaust gas to preheat said secondary air.

13. The turbocharging system of claim 2, wherein said turbine portion is comprised of ceramic material.

14. The turbocharging system of claim 2, wherein said turbine portion is rotatably supported by an air bearing.

15. The turbocharging system of claim 2, where said secondary air supply means include means for regulating the pressure of said secondary air.

16. The turbocharging system of claim 15, wherein said regulating means maintains said secondary air at a pressure about 3 kg/cm² higher than the pressure of said exhaust gas in said exhaust manifold.

17. The turbocharging system of claim 16, wherein said regulating means includes a secondary air regulator communicating with said exhaust manifold through a vent pipe.

18. The turbocharging system of claim 2, wherein said control means includes feedback means for maintaining the air-fuel ratio of the mixture of said exhaust gas and said secondary air at approximately 13.8:1.

19. A turbocharging system for an internal combustion engine having an exhaust system including an exhaust manifold for removing exhaust gas from said engine, said turbocharging system comprising:
   a. a turbocharger including a turbine portion and a compressor portion connected together by shaft means, said turbine portion being in flow communication with said exhaust system and being rotatably driven by said exhaust gas; and
   b. secondary air supply means for adding secondary air to said exhaust gas upstream of said turbine portion with respect to the direction of flow of said exhaust gas when the temperature of said exhaust gas is above a prescribed temperature and the air-fuel ratio of said exhaust gas is below a prescribed ratio, said secondary air combusting with unburned fuel remaining in said exhaust gas to increase the temperature and pressure of said exhaust gas driving said turbine portion.

* * * * *